UNITED STATES PATENT OFFICE.

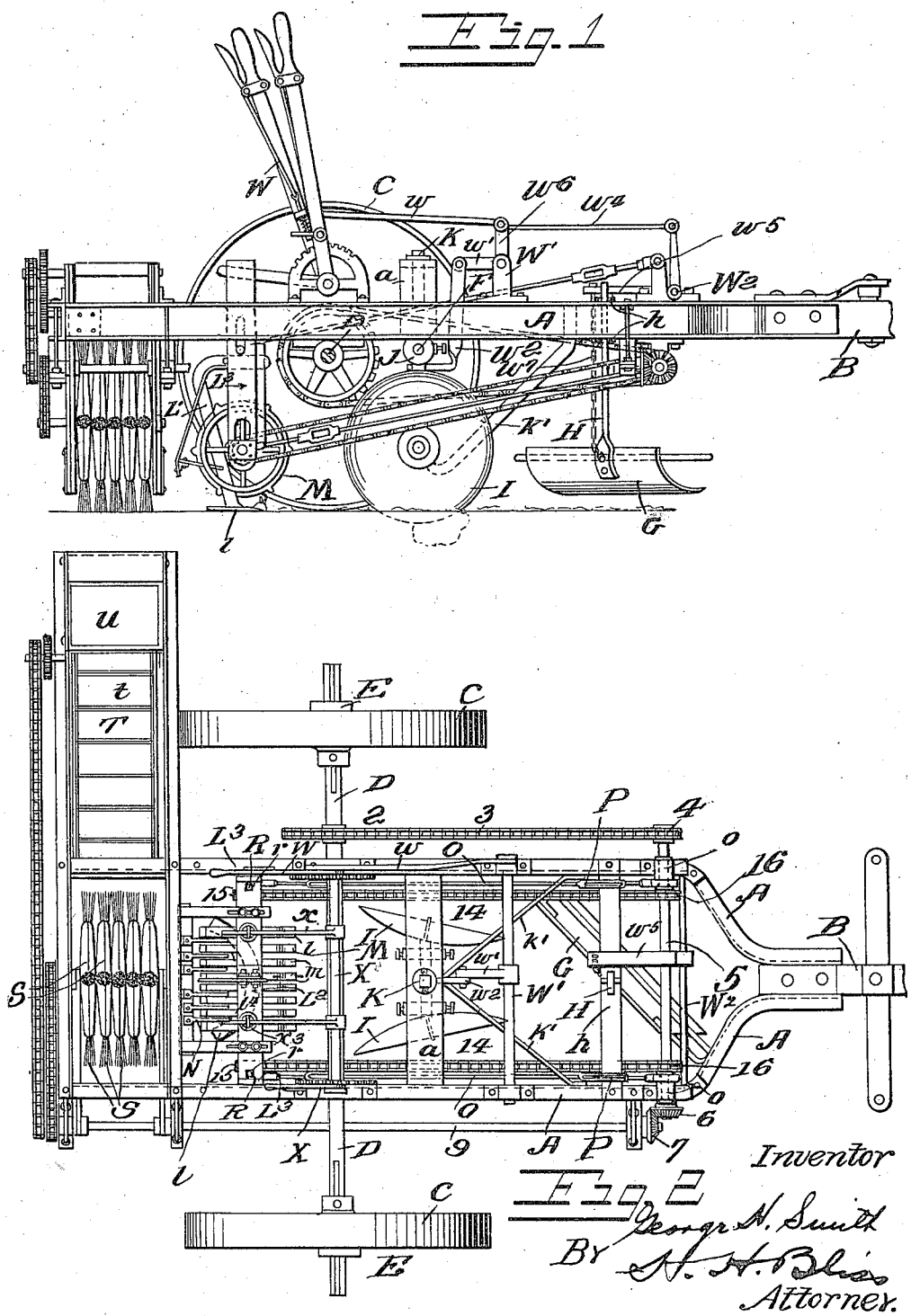

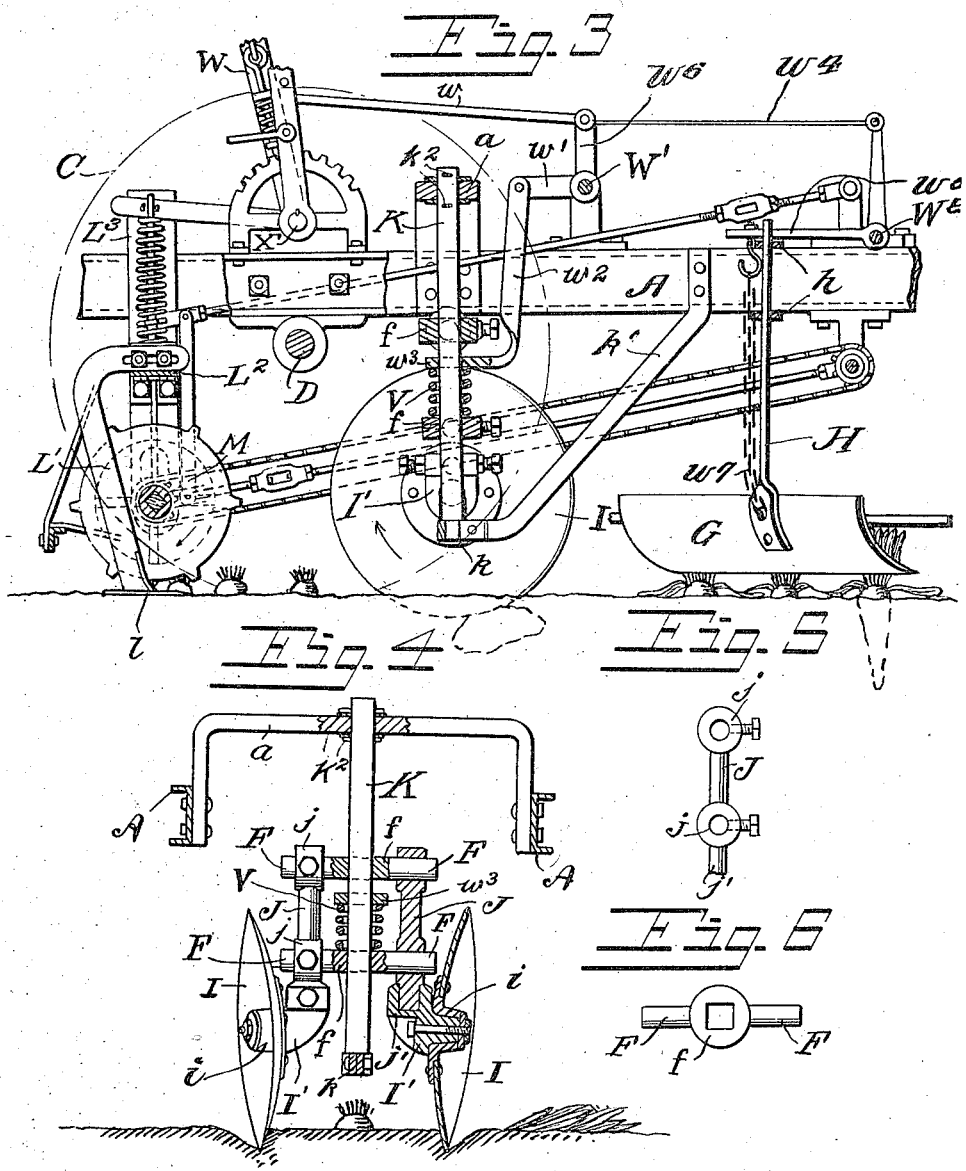

GEORGE H. SMITH, OF COLUMBUS, OHIO.

BEET-TOPPING MACHINE.

1,301,330.     Specification of Letters Patent.     Patented Apr. 22, 1919.

Original application filed December 16, 1913, Serial No. 807,046. Divided and this application filed August 20, 1917. Serial No. 187,177.

*To all whom it may concern:*

Be it known that I, GEORGE H. SMITH, a citizen of the United States, residing at Columbus, in the county of Franklin and State of Ohio, have invented certain new and useful Improvements in Beet-Topping Machines, of which the following is a specification, reference being had therein to the accompanying drawing.

This invention relates to improvements in the machines for topping beets.

Figure 1 is a side elevation of a mechanism embodying my improvements.

Fig. 2 is a top plan view.

Fig. 3 is a view of the part of the machine taken on a central vertical longitudinal plane of section through the machine.

Fig. 4 shows the vertically cutting disks which immediately precede the topping cutter.

Figs. 5 and 6 illustrate details.

The main frame comprises sills A, A, and suitable cross bars, the sills being curved in at the front ends and attached to tongue B. C, C, are the ground wheels connected to axle D by backing rachets.

The topping cutter is indicated by $l$. It has a standard $L'$, the cutter $l$, itself, extending laterally in a horizontal plane and so positioned as to sever the crowns as desired. M is a gage drum for the cutter. It is composed of a series of disks or wheels $m$ mounted on a horizontal transversely arranged shaft. A frame, with uprights $L^3$ and cross bar $L^2$ carries the drum and cutter.

This frame or support for the drum and the topping cutter can be of any suitable construction, as can also the devices by which it is attached to, and adjusted upon, the frame, and also the devices by which the severed tops are taken laterally from the rear of the machine, and the power transmitting devices for actuating all the last said parts. Reference can be made to my copending application 807046 filed December 16, 1913 (of which the present application is a division) for a full understanding of all of said parts. It will be understood that they should be of such character and so arranged as to properly operate in a mechanism having the devices to which the present claims more particularly relate.

The topping cutter and gage drum are elongated transversely, the shaft of the drum extending from one side of the machine to the other and being firmly braced over a wide base. Moreover, the drum and cutter being thus elongated, there is assurance that they will contact with all of the beets, even those that may be considerably out from the predetermined line of the plants.

Elongating the cutter increases the resistance to its travel through the ground, particularly when the latter is clayey or heavy. By devices to be described I form clearance furrows at the ends of the cutter $l$, which devices also greatly reduce the volume of leaf matter before the drum or cutter reach the beets successively. G is a shear cutter to sever the upstanding green leaves. Those which lie upon the ground or project laterally on lines near it are severed from the beets by cutter disks I, I which also form furrows.

Cutter G is a long concavo-convex blade inclined to the path of advance with its edge a short distance above the upper ends of the beets. It cuts the upstanding leaves and carries them laterally to lines outside of the paths of the other parts. It is rigidly held in working position by bar H but can slide and be vertically adjusted in cross bar $h$.

The leaves which at harvesting time lie dead and flat on the ground are positioned too low to be cut by the blade G but they are severed by the disks I, I. These are concavo-convex and are mounted to be turned by the soil. They are supported by a frame sliding on the square rod K, the upper end of the latter being secured at $k^2$ in a cross frame bar $a$ and the lower end being held at $k$ by braces $k'$. The disk frame has horizontal arms F, F with hubs $f$ fitted to the rod K. J, J, are hanger rods, each having eyes $j$ $j$ fitting the end parts of the arms F, F, and also having journals $j'$ at their lower ends. The hub $i$ of each disk I is fitted to the journal part of a carrier $I'$ formed with a sleeve fitting the journal $j'$. The parts J and F permit the disks, either or both, to be adjusted laterally of the machine. The sleeves and journals at $j'$ permit the disks to be set at any desired angles to the lines of advance.

W is a lever connected by a link $w$ and crank $w^6$ to rock shaft W' on the frame. Link $w^2$ is loosely connected by eye $w^3$ to rod K at points between the horizontal bars F, F, this link being connected by crank $w'$ to shaft W'.

A spring V positioned between link eye $w^3$ and the lower arm F loosely surrounds rod K. The lever W can be set so that the disks will be pressed downward, more or less yieldingly. But the lever can be used to swing the link eye $w^3$ upward to engage with the upper arm F and lift the disk system out of the ground.

The disks should be so adjusted and set that they will not only penetrate the surface far enough to effectually sever the laterally projecting leaves, but also so as to form furrows sufficiently deep to assuredly provide clearance for the long laterally projecting topping cutter at the times when it is traveling in planes below the surface; the disks being adjustable laterally as set forth to coincide with the lines of travel of the ends of the cutter. The angles at which they are set, relatively to the vertical longitudinal planes of advance of the machine, should be such as to assist in overcoming side draft caused either by the inclined cutter G, the topping cutter, or the deflector. And by forming and arranging the disk supporting devices in the way above described all of these adjustments can be readily obtained.

The cutter G can be adjusted by the same lever W. $W^4$ is a link extending from crank $w^6$ to cross shaft $W^2$. $w^5$ is a crank on shaft $W^2$ connected by chain $w^7$ with cutter G, and permits the latter to rise. Bar H being loose in support $h$ is free to move vertically. The normal position of the cutter is governed by the device which attaches the upper end of chain $w^7$ to the crank $w^5$.

What I claim is:

1. The combination of the laterally elongated drum, the laterally elongated topping cutter, the opposed vertically arranged disk cutters immediately in front of the topping cutter, and the supporting devices for the disk cutters adapted to permit them to be adjusted laterally relatively to the outer ends of the topping cutter and of the drum.

2. The combination of the laterally elongated topping cutter, the laterally elongated gage drum, the front transversely inclined horizontally arranged cutter G for severing the upstanding leaves, the intermediate opposed vertically arranged disk cutters arranged to be independently adjustable laterally relative to the ends of the topping cutter and the drum and relatively to the front horizontal cutter.

3. The combination of the laterally elongated topping cutter, the opposed vertically arranged disks, the supporting devices for the disks arranged to permit them to yield vertically and to be adjusted independently of each other relatively to the path of the machine and to be adjusted laterally relatively to the ends of the topping cutter.

4. The combination of the frame, the single front cutter having its cutting edge extended from side to side of the plant row and inclined across the central part longitudinally of the frame for severing the upstanding leaves, the opposed vertically arranged disk cutters, the disk-carrying frame yieldingly held against upward movement, the disk supports on the frame on which the disks are bodily adjustable laterally and are horizontally angularly adjustable to compensate for the inclination of the front cutter.

5. The combination of the frame, the single front cutter having its cutting edge extended from side to side of the plant row and inclined across the central part longitudinally of the frame for severing the upstanding leaves, the opposed vertically arranged disk cutters, the supporting device for the disks adapted to permit them to be independently adjusted angularly horizontally relatively to the front cutter.

In testimony whereof, I affix my signature, in presence of two witnesses.

GEORGE H. SMITH.

Witnesses:
 GEO. E. McCONLEY,
 GEORGE E. McCONLEY, Jr.

Copies of this patent may be obtained for five cents each, by addressing the "Commissioner of Patents, Washington, D. C."